Feb. 3, 1931.  W. A. CHRYST  1,791,193
SHOCK ABSORBER
Filed Sept. 28, 1928   2 Sheets-Sheet 2
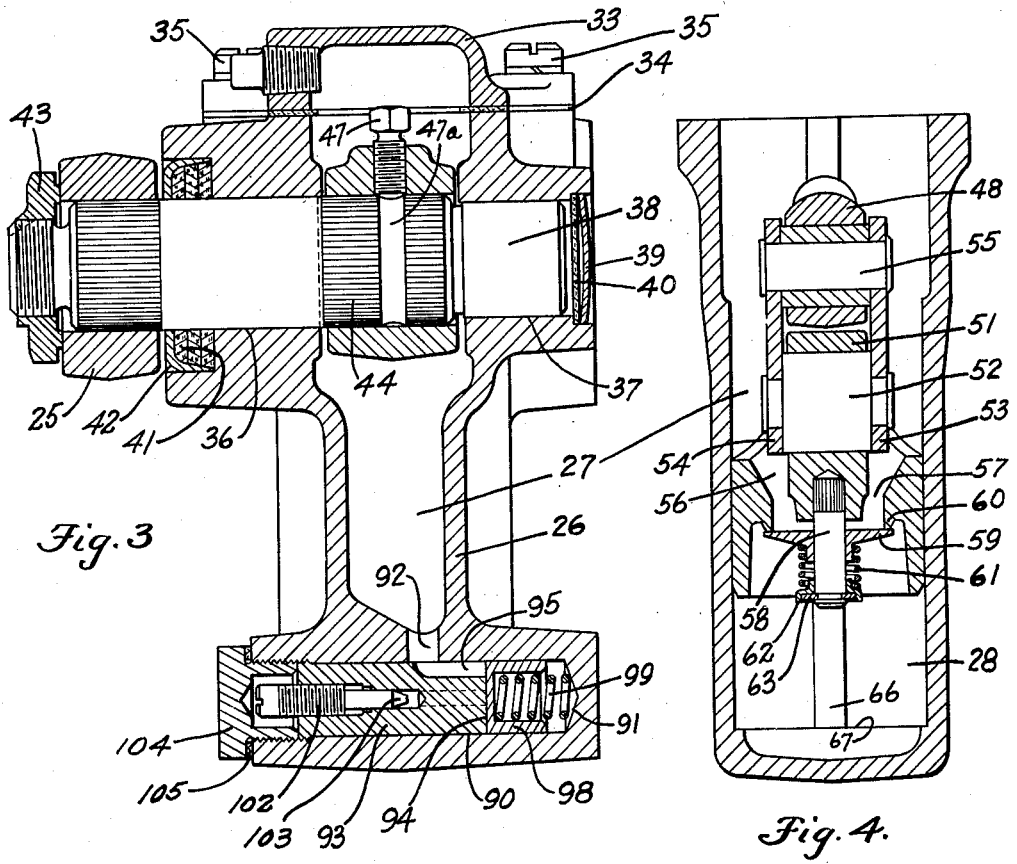
Fig. 3
Fig. 4
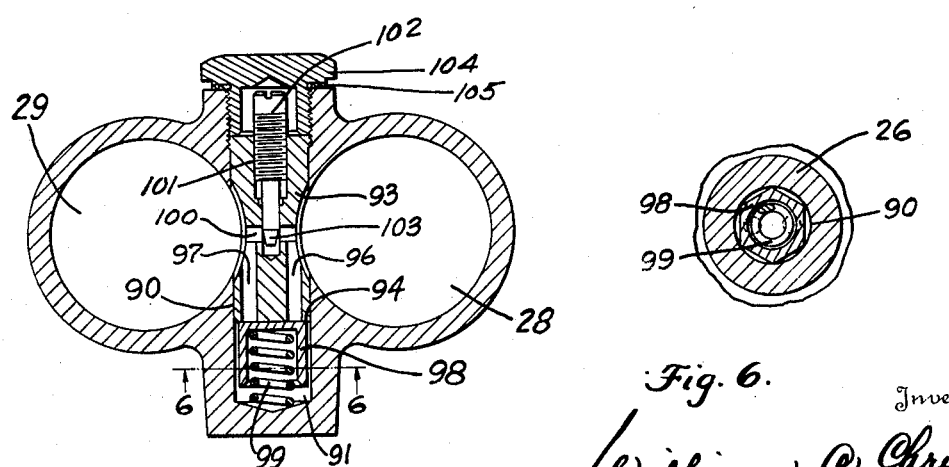
Fig. 5
Fig. 6
Inventor
William A. Chryst
By Spencer, Hardman and Zehn
Attorney Patented Feb. 3, 1931

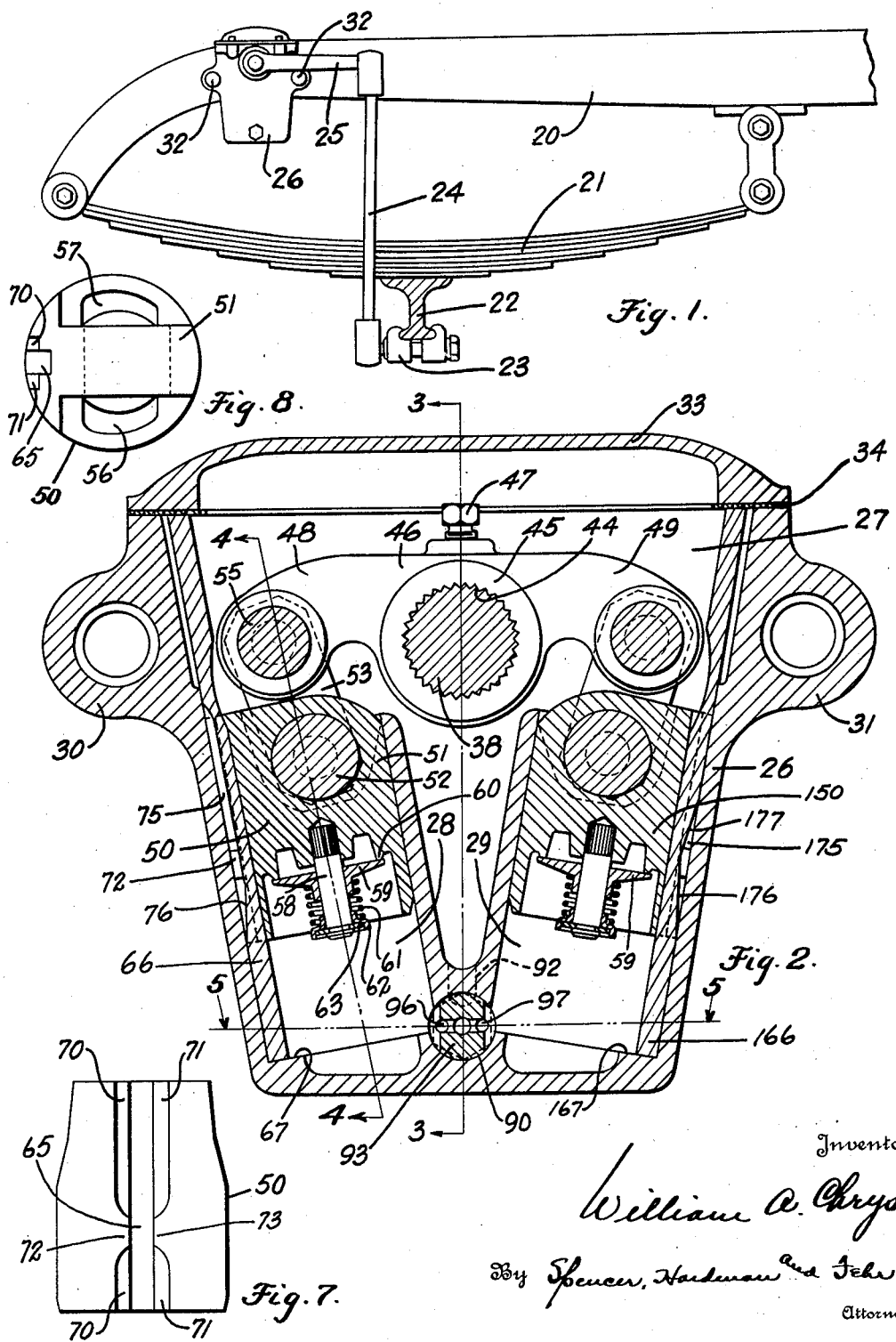

1,791,193

UNITED STATES PATENT OFFICE

WILLIAM A. CHRYST, OF DAYTON, OHIO, ASSIGNOR, BY MESNE ASSIGNMENTS, TO DELCO PRODUCTS CORPORATION, OF DAYTON, OHIO, A CORPORATION OF DELAWARE

SHOCK ABSORBER

Application filed September 28, 1928. Serial No. 308,919½.

This invention relates to improvements in shock absorbers for cushioning the movement of two relatively movable members, for example a frame and axle of a vehicle.

It is among the objects of the present invention to provide a shock absorber of simple structure and design, capable of resisting both the approaching and separating movements of the frame and axle of a vehicle, thereby dissipating road shocks and substantially preventing the transmission of such shocks to the vehicle frame.

Further objects and advantages of the present invention will be apparent from the following description, reference being had to the accompanying drawings, wherein a preferred embodiment of one form of the present invention is clearly shown.

In the drawings:

Fig. 1 illustrates the front portion of the frame of an automotive vehicle supported by springs upon the usual axle, the shock absorber embodying the present invention being shown applied thereto.

Fig. 2 is a cross sectional view taken longitudinally through the shock absorber.

Fig. 3 is a view taken along the line 3—3 of Fig. 2.

Fig. 4 is a fragmentary sectional view taken along the line 4—4 of Fig. 2.

Fig. 5 is a view taken along the line 5—5 of Fig. 2.

Fig. 6 is a fragmentary sectional view taken along the line 6—6 of Fig. 5.

Fig. 7 is a detailed side elevation of one of the pistons.

Fig. 8 is a detailed plan view of one of the pistons.

Referring to the drawings, and particularly to Fig. 1, the numeral 20 designates the frame of the vehicle, having hingedly secured thereto vehicle springs, only one of which, designated by the numeral 21, is illustrated. The spring 21 is supported upon the axle 22 to which the road wheels of the vehicle (not shown) are attached. A bracket 23 is secured to axle 22, and to said bracket one end of a connecting rod 24 is swivelly attached. The other end of said connecting rod 24 is swivelly secured to the free end of the shock absorber operating arm 25.

The shock absorber comprises a casing 26 presenting a fluid chamber 27 and two cylinders 28 and 29, the cylinder 28 being termed the "bumper" side of the shock absorber, while the cylinder 29 is termed the "snubber" side. Two oppositely disposed ears 30 and 31 are formed on the casing and are apertured to receive bolts 32 by which the casing 26 is secured to the frame 20. A cover 33 provided with a gasket 34 is secured to casing 26 by screws 35, said cover forming a fluid-tight cap for the shock absorber casing.

The casing 26 has oppositely disposed lug portions providing bearings 36 and 37 in which is journalled the rocker shaft 38 which extends through the fluid chamber, one end projecting outside the shock absorber casing. The end of the passage providing bearing portion 37 is sealed against fluid leaks by a plug 39 having a gasket 40 associated therewith. The journal 36 is sealed to prevent fluid leaks by a plurality of packing rings 41 which are urged into sealing engagement with the rocker shaft 38 by the packing gland or collar 42 which fits snugly into a recess provided in the lug portion of the casing providing the bearing 36. The end of the shaft 38 extending outside the casing has the shock absorber operating arm 25 secured thereto so that the arm 25 and shaft 38 will rotate together. The nut 43 maintains the arm 25 upon the end of shaft 38. Within the fluid chamber 27, rocker shaft 38 is provided with knurls 44 cooperating with a knurled hub 45 of a rocker lever 46, rigidly to attach said rocker lever to said shaft so that these two may rotate as a unit. The set screw 47 extending into the annular groove 47a in the shaft 38, prevents relative endwise movement between the rocker lever 46 and shaft 38. Rocker lever 46 has oppositely disposed lever arms 48 and 49, the former aligning with the "bumper" cylinder 28, the latter with the "snubber" cylinder 29.

In each cylinder there is provided a reciprocative fluid displacement member or piston, and inasmuch as both of these pistons are constructed alike, only one will detailedly be described, reference being had to the "bumper" piston 50 reciprocative in the cylinder 28. The head of the piston 50 is provided with an extending lug portion 51 carrying a transverse pin 52 which extends from each side of the lug 51, and to each end of which there is pivoted one end of links 53 and 54. The other ends of said links are pivoted to a cross pin 55 supported in the free end of the lever arm 48. Thus links 53 and 54 operatively connect the piston 50 with the lever arm 48, thereby causing the piston to be moved into the cylinder and toward the bottom thereof when the lever arm 48 is moved in a counter-clockwise direction in response to the flexing movement of spring 21 caused by the wheels of the vehicle striking an obstruction in the road. The piston 50 is moved upwardly and away from the end of the cylinder 28 when the spring 21 returns to its normal position. The head portion of the piston has two diametrically opposite passages 56 and 57, which provide for the unrestricted transfer of fluid from one side of the piston to the other in response to the movement of the piston in one direction. This transfer of fluid is controlled by a valve mechanism including the valve pin 58 rigidly supported in the piston head so that said valve pin is substantially coaxial of the piston. A valve 59 is slidably supported upon the valve pin 58 and is normally held in engagement with the valve seat 60 by a spring 61, interposed between valve 59 and a spring abutment cup 62, secured to the outer end of stem 58 by a C-washer 63. The valve seat 60 comprises an annular flange provided within the piston.

In the outer surface of the piston 50, there is provided a longitudinal groove 65 (see Figs. 7 and 8), of sufficient width and depth to receive the metering pin 66 extending longitudinally of the cylinder. One end of said pin rests upon the bottom wall 67 of cylinder 28, the other end is engaged by the cover 33 which maintains the metering pin in proper position. With the exception of oppositely disposed areas 72 and 73, groove 65 has cut-away portions 70 and 71 in its respective sides, providing fluid flow passages.

Metering pin 66 aforementioned is provided with a recess 75, one end of which slopes toward the cylinder wall as at 76. This sloping portion of the recess 75 is so located on the metering pin 66 that it will lie adjacent the bottom end of the piston 50 when said piston is in the normal position as shown in Fig. 2. In this position the narrower part of groove 65, defined by areas 72 and 73, will be positioned substantially at the point where the wall of recess 75 begins to slope toward the wall of the cylinder. This is clearly illustrated in Fig. 2.

The "snubber" piston designated by the numeral 150 is exactly like the piston 50 of the "bumper" side of the shock absorber. The metering pin 166 is, however, different than the metering pin 66. Metering pin 166 is provided with a recess 175 having converging surfaces 176 and 177. The portion of the groove of this piston 150 corresponding to the portion of groove 65 of piston 50, defined by areas 72 and 73, is positioned substantially midway of recess 175 when the piston 150 is in normal position as illustrated in Fig. 2.

The valves 59 of each cylinder are adapted to establish a free flow of fluid from the fluid chamber 27, through passages 56 and 57, into the respective cylinders 28 and 29 in response to the movement of the respective pistons in one direction, that is, in the direction away from their closed ends 67 and 167 respectively. The metering pins 66 and 166 co-acting with the grooves of the respective pistons 50 and 150 establish a variably restricted, return flow of fluid from the respective cylinders 28 and 29 to the fluid chamber in response to the movement of the respective pistons in the other direction or, downwardly toward the said closed ends of the cylinders.

The shock absorber is provided with a valve unit adapted to establish a restricted flow of fluid from one cylinder to the other cylinder in response to the movement of the respective pistons in said other direction, or toward the closed ends of their cylinders, said valve also having provisions for establishing a restricted flow of fluid from either one of said cylinders into the other and also into fluid chamber in accordance with the excess of pressure in either one of the cylinders beyond a predetermined degree.

In the casing 26 between cylinders 28 and 29, there is provided a transverse cylindrical passage 90 having a closed end 91 and an open end terminating outside of the shock absorber casing. A passage 92 provides communication between said cylindrical passage 90 and the fluid chamber 27. Passage 90 is also in communication with each of the cylinders 28 and 29. In passage 90 there is provided a cylindrical valve-plug 93 having one end 94 providing a valve-seat, spaced from the closed end 91 of passage 90. Plug 93 has a passage 95 terminating at one end in the valve-seat 94, the other end communicating with passage 92 which leads to the fluid chamber 27. In diametrically opposite sides of the plug 93, there are provided separate passages 96 and 97 respectively, said passages terminating at one end in the valve-seat 94, the other ends of said passages communicating respectively with cylinders 28 and 29. A valve 98 within the chamber formed between the valve-seat 94 and the end wall 91 is yieldably maintained against the valve-seat 94 by a spring 99. The contour of the valve 98 is preferably polygonal (see Fig. 6), the corners thereof providing for substantially frictionless engagement with the inner wall of the passage 90 slidably to support the valve in said passage, the flat surfaces of the valve providing spaces between said valve and the inner wall of the passage 90, through which fluid may escape from between the valve 98 and the end wall 91, substantially preventing said valve to become fluid logged, which would materially affect the efficient operation of the valve.

The communication between the cylinders for establishing a fluid flow from one cylinder to the other, is provided by the passage 100. A screw-threaded recess 101 provided in the outer end of plug 93 receives the metering pin 102, one end of which extends outside of the casing so as to be accessible for manual adjustment. The other end of the metering pin 102 has tapered portion 103 which extends into the passage 100 and controls the fluid flow capacity of said cross passage. A recessed nut 104 provided with a gasket 105 provides a sealing cover for the open end of passage 90.

When the road wheels of the vehicle strike an obstruction in the roadbed, the spring 21 will be flexed toward frame 20, causing the arm 25 to be moved counter-clockwise and thus rotate the shaft 38 and its attached lever 46 in the same direction. The arm 48 of said lever pushes its piston down into its respective cylinder 28, the arm 49 of said lever concomitantly lifts its piston 150 out of its respective cylinder 29. The piston 50 in its movement downward will exert a pressure upon the fluid within cylinder 28, said fluid having two available paths of escape within a predetermined range of fluid pressure within the cylinder. One path of fluid flow is through the passage 100, past the tapered portion 103 of the metering pin 102 into the adjacent cylinder 29, the piston of which is moving on its suction stroke or upwardly. The second path of fluid flow from cylinder 28 will be through the orifice presented by the piston 50, its longitudinal groove 65 and the recess 75 of the metering pin 66. It will be seen that as piston 50 moves downwardly along the metering pin 66, over declining, sloping surface 76 of the recess 75, the fluid flow orifice will gradually be decreased and thus the fluid flow through said orifice will gradually, increasingly be restricted. The movement of the piston downwardly will consequently be gradually, increasingly resisted and likewise the lever connections will resist the flexing movement of the spring 21 toward the frame 20. If a large obstruction is met in the roadway and the piston 50 is moved a substantial distance into its cylinder 28 and at a substantially high rate, excessive fluid pressure will obtain within said cylinder 28, said fluid pressure being exerted upon the valve 98, through the passage 96, moving said valve from the valve seat 94 against the effect of spring 99 and thus establishing a fluid flow through passage 96, past valve 98, through passages 95 and 92 into the fluid chamber 27 and also from passage 96, past valve 98, through passage 97 into the adjacent cylinder. From this it may be seen that the valve 98 will be moved to provide a fluid flow in accordance with the excess of pressure in cylinder 28 beyond a predetermined value.

While piston 50 is moving downwardly toward the bottom of its cylinder 28, piston 150 is moving outwardly away from the bottom of its cylinder 29, the fluid within the fluid chamber 27 exerting a pressure upon the valve 59 of piston 150 to establish a free flow of fluid from the fluid chamber past said valve 59 into the cylinder 29. As soon as the spring 21 has reached its limit of flexure, caused by the striking of an obstruction, its tendency is to suddenly rebound into normal position. This tendency of the spring to rebound is resisted in the following manner: The spring in traveling toward its flexed position will have moved piston 150 upwardly in its cylinder and along its metering pin 166 so that the narrow area of its piston groove 65 will have reached a position substantially where the one sloping surface 177 of the recess 175 meets the wall of the cylinder. As the piston moves downwardly, the fluid flow orifice provided between the piston groove and the metering pin recess 175 is comparatively small and thus the fluid flow is substantially, highly restricted, therefore the movement of the piston downwardly due to the rebound action of the spring 21, will initially be substantially highly resisted. As the piston 150 continues to move downwardly along the metering pin 166, the narrower portion of the piston groove will gradually approach the widest portion of recess 175, thus the fluid flow orifice is gradually increased whereby the restriction to the fluid flow is gradually decreased and consequently the resistance to the piston movements is directly decreased. However, after the said narrower portion of the piston groove has reached the middle or widest portion of recess 175 in pin 166, it will begin to move over the declining surface 176 of the recess 175, continued movement along this declining surface gradually decreasing the fluid flow orifice and thus gradually increasing the restriction to the fluid flow, consequently the resistance to the continued downward movement of the piston will be gradually, increasingly resisted. From this it may be seen that, during the travel of the piston 150 downwardly over the entire range of the recess 175 of its metering pin 166, the piston movement will gradually, decreasingly be resisted for the first part of its travel, while for the latter part of its movement downwardly the piston will gradually, increasingly be resisted.

Like the "bumper" side, downward movement of piston 150 on the "snubber" side will establish a restricted flow of fluid from cylinder 29, through the passage 100, past metering pin 102 into the cylinder 28. Also any increase of pressure in cylinder 29 beyond a predetermined value will accordingly be relieved by the movement of valve 98 from the valve seat member 94, establishing a fluid flow through passage 97, past valve 94, passages 95 and 92 into the fluid chamber 27.

From the aforegoing it may be seen that applicant has provided a double-acting shock absorber adapted to control the vehicle spring action in such a manner that, upon flexing, the movement of the spring is gradually, increasingly resisted as it approaches its limit of flexure and upon its rebound the spring is at first gradually, decreasingly resisted and then gradually, increasingly resisted. A safety device of simple structure and design has been provided which substantially eliminates the danger of breakage due to high pressures being exerted within the shock absorber by the striking of comparatively large obstructions in the roadbed. The shock absorber has been designed to facilitate manufacture, the various parts being so constructed that they may be assembled at a minimum expenditure of time and labor.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a fluid chamber and a pair of cylinders, a piston in each cylinder, means for operating said pistons, means for establishing a free flow of fluid from the fluid chamber into the respective cylinders in response to the movement of the respective pistons in one direction, means for establishing a restricted flow of fluid from the respective cylinders into the fluid chamber in response to the movement of the respective pistons in the other direction, and dual means including a constant orifice and a spring-loaded valve for establishing restricted flows of fluid from one cylinder directly into the other in response to the movement of either piston in said other direction.

2. A shock absorber comprising in combination, a casing presenting a fluid chamber and a pair of cylinders, a piston in each cylinder, means for operating said pistons, means for establishing a free flow of fluid from the fluid chamber into the respective cylinders in response to the movement of the respective pistons in one direction, means for establishing a restricted flow of fluid from the respective cylinders into the fluid chamber in response to the movement of the respective pistons in the other direction; and passages common to both cylinders, and adapted successively to establish restricted flows of fluid from one cylinder directly into the other in response to the movement of either piston in said other direction.

3. A shock absorber comprising in combination, a casing presenting a fluid chamber and a pair of cylinders, a piston in each cylinder, means for operating said pistons, means for establising a free flow of fluid from the fluid chamber into the respective cylinders in response to the movement of the respective pistons in one direction, means for establishing a restricted flow of fluid from the respective cylinders into the fluid chamber in response to the movement of the respective pistons in the other direction, passages providing direct communication between the two cylinders, and adapted successively to establish restricted flows of fluid from one of said cylinders to the other in response to the movement of either one of said pistons in said other direction, a spring-loaded valve normally closing one of said passages, and manually adjustable means for varying the flow capacity of the other of said passages.

4. A shock absorber comprising in combination, a casing presenting a fluid chamber and a pair of cylinders, a piston in each cylinder, means for operating said pistons, means for establishing a free flow of fluid from the fluid chamber into the respective cylinders in response to the movement of the respective pistons in one direction, means for establishing a restricted flow of fluid from the respective cylinders into the fluid chamber in response to the movement of the respective pistons in the other direction, a passage providing direct communication between the two cylinders, and adapted to establish a restricted flow of fluid from one of said cylinders to the other in response to the movement of either one of said pistons in said other direction, a manually adjustable metering pin for varying the flow capacity of said passage, said metering pin being accessible from outside the shock absorber casing, and a valve controlled by-pass for said passage, adapted, in response to proper pressures, to by-pass fluid around the said metering pin.

5. A shock absorber comprising in combination, a casing presenting a fluid chamber and a pair of cylinders, a piston in each cylinder, means for operating said pistons, means for establishing a free flow of fluid from the fluid chamber into the respective cylinders in response to the movement of the respective pistons in one direction, means for establishing a restricted flow of fluid from the respective cylinders into the fluid chamber in response to the movement of the respective pistons in the other direction, means for establishing a restricted flow of fluid from one cylinder to the other in response to the movement of either piston in said other direction, and means for establishing an additional flow of fluid from either cylinder to the fluid chamber and to the other cylinder in response to excessive fluid pressures in one or the other cylinder.

6. A shock absorber comprising in combination, a casing presenting a fluid chamber and a pair of cylinders, a piston in each cylinder, means for operating said pistons, means for establishing a free flow of fluid from the fluid chamber into the respective cylinders in response to the movement of the respective pistons in one direction, means for establishing a restricted flow of fluid from the respective cylinders into the fluid chamber in response to the movement of the respective pistons in the other direction, means for establishing a restricted flow of fluid from one cylinder directly into the other in response to the movement of either piston in said other direction, and means for establishing an additional flow of fluid from one or the other cylinders into the fluid chamber and into the adjacent cylinder, said means graduating the flow in accordance with the excess of pressure in either of the cylinders beyond a predetermined degree.

7. A shock absorber comprising in combination, a casing presenting a fluid chamber and a pair of cylinders, a piston in each cylinder, means for operating said pistons, means for establishing a free flow of fluid from the fluid chamber into the respective cylinders in response to the movement of the respective pistons in one direction, means for establishing a restricted flow of fluid from the respective cylinders into the fluid chamber in response to the movement of the respective pistons in the other direction, a manually adjustable, constant flow orifice providing communication between the two cylinders, and adapted to establish a restricted flow of fluid from one of said cylinders to the other in response to the movement of either one of the pistons in their respective cylinders in the other direction, and a by-pass for said constant flow orifice, having a valve automatically operable in response to increased pressure, to establish a flow from cylinder to cylinder around said orifice.

8. A shock absorber comprising in combination, a casing presenting a fluid chamber and a pair of cylinders, a piston in each cylinder, means for operating said pistons, means for establishing a free flow of fluid from the fluid chamber into the respective cylinders in response to the movement of the respective pistons in one direction, means for establishing a restricted flow of fluid from the respective cylinders into the fluid chamber in response to the movement of the respective pistons in the other direction, means for establishing a restricted flow of fluid from one cylinder to the other in response to the movement of either piston in said other direction, and a spring loaded safety valve adapted to establish an additional flow of fluid from either cylinder into the fluid chamber and into the adjacent cylinder in accordance with excess of pressure in either of said cylinders beyond a predetermined degree.

9. A shock absorber comprising in combination, a casing presenting a fluid chamber and a pair of cylinders, a piston in each cylinder, means for operating said pistons, means for establishing a free flow of fluid from the fluid chamber into the respective cylinders in response to the movement of the respective pistons in one direction, means for establishing a restricted flow of fluid from the respective cylinders into the fluid chamber in response to the movement of the respective pistons in the other direction, and a common valve member for both cylinders, having provisions to establish a restricted flow of fluid from one cylinder to the other in response to the movement of the respective pistons in the other direction, and having provisions also to establish an additional flow of fluid from either cylinder to the fluid chamber, said additional flow being graduated in accordance with the excess of pressure in either of the cylinders beyond a predetermined value.

10. A shock absorber comprising in combination, a casing presenting a fluid chamber and a pair of cylinders, a piston in each cylinder, means for operating said pistons, means for establishing a free flow of fluid from the fluid chamber into the respective cylinders in response to the movement of the respective pistons in one direction, means for establishing a restricted flow of fluid from the respective cylinders into the fluid chamber in response to the movement of the respective pistons in the other direction, and a common valve unit interposed between both cylinders so as to communicate therewith, said valve unit having a manually adjustable, constant flow orifice and normally closed, pressure controlled passages the constant flow orifice establishing a restricted flow of fluid from one cylinder to the other in response to the movement of the respective pistons in the said other direction, the pressure controlled passages establishing an additional flow of fluid from either of the cylinders to the fluid chamber in accordance with the excess of pressure in either of said cylinders beyond a predetermined degree.

11. A shock absorber comprising in combination, a casing presenting a fluid chamber and a pair of cylinders, a piston in each cylinder, means for operating said pistons, means for establishing a free flow of fluid from the fluid chamber into the respective cylinders in response to the movement of the respective pistons in one direction, means for establishing a restricted flow of fluid from the respective cylinders into the fluid chamber in response to the movement of the respective pistons in the other direction, and a fluid flow controlling device common to both cylinders, said member comprising a valve plug having a passage leading to the fluid chamber and terminating in one end surface of the plug, a passage on each side of the plug, each one leading from a respective cylinder and terminating in the said end surface, a spring loaded valve normally engaging the said end surface of the valve plug to close off communication between the three passages terminating in said end surface, a transverse passage in the plug, connecting the two cylinders, and an adjustable metering pin screw threaded into the plug and extending into the transverse passage.

12. A shock absorber comprising in combination, a casing presenting a fluid chamber and a pair of cylinders, a piston in each cylinder, means for operating said pistons, means for establishing a free flow of fluid from the fluid chamber into the respective cylinders in response to the movement of the respective pistons in one direction, means for establishing a restricted flow of fluid from the respective cylinders into the fluid chamber in response to the movement of the respective pistons in the other direction, and a fluid flow controlling device comprising a fluid flow conduit leading from one cylinder to the other, manual means, adjustable to vary the fluid flow capacity of said conduit, a valve seat, separate passages leading from each cylinder and from the fluid chamber, all terminating in said valve seat, a valve normally engaging the valve seat to close the said passages, and a spring yieldably urging the valve against the seat, said spring holding the valve immovably against said seat within a predetermined range of pressures in either cylinder.

13. A shock absorber comprising in combination, a casing presenting a fluid chamber and a pair of cylinders, a piston in each cylinder, means for operating said pistons, means for establishing a free flow of fluid from the fluid chamber into the respective cylinders in response to the movement of the respective pistons in one direction, means for establishing a restricted flow of fluid from the respective cylinders into the fluid chamber in response to the movement of the respective pistons in the other direction, a transverse cylindrical passage in the casing, having one closed end, the other end leading outside the casing, said passage having communication with both cylinders, a cylindrical valve plug in said passage, one end providing a valve seat, spaced from the closed end of the transverse passage, separated passages in the plug leading from the respective cylinders and from the fluid chamber and terminating in the valve seat, a valve normally engaging said valve seat to close the three passages terminating therein, the valve being polygonal to provide comparatively sharp edges by which the valve is slidably supported within the transverse passage and by which there are provided spaces for venting the chamber between the valve and the closed end of the transverse passage, a spring interposed between said valve and the closed end of the passage, a cross passage in the plug providing communication between the cylinders, and a manually adjustable metering pin in the plug and extending into the cross passage.

14. A shock absorber comprising in combination, a casing presenting two cylinders, a piston in each cylinder; a passage between the cylinders providing for a constantly restricted flow of fluid between said cylinders in either direction; and a valve controlled passage between said cylinders adapted to become effective to establish a flow of fluid between said cylinders in either direction when a proper fluid pressure is attained.

15. A shock absorber comprising, in combination, a casing presenting a fluid reservoir and two cylinders; a passage between said cylinders providing for a constantly restricted flow of fluid from one cylinder to the other in either direction; a second passage between said cylinders; a spring-loaded valve normally closing said second passage, but adapted to open said passage at a proper fluid pressure in either cylinder; and a passage leading from the fluid reservoir and adapted to communicate with the second passage when the valve is operated to open it.

16. A shock absorber comprising, in combination, a casing presenting a fluid chamber and a pair of cylinders, a piston in each cylinder, means for operating said pistons, means for establishing a free flow of fluid from the fluid chamber into the respective cylinders in response to the movement of the respective pistons in one direction, means for establishing a restricted flow of fluid from the respective cylinders into the fluid chamber in response to the movement of the respective pistons in the other direction, and two fluid flow passages between the cylinders, one constantly open and providing for a constantly restricted flow in either direction, the other normally closed and being adapted to provide for a variably restricted flow between the cylinders in either direction.

17. A shock absorber comprising, in combination, a casing presenting a fluid chamber and a pair of cylinders, a piston in each cylinder, means for operating said pistons, means for establishing a free flow of fluid from the fluid chamber into the respective cylinders in response to the movement of the respective pistons in one direction, means for establishing a restricted flow of fluid from the respective cylinders into the fluid chamber in response to the movement of the respective pistons in the other direction, and two fluid flow passages between the cylinders, one constantly open and providing for a constantly restricted flow in either direction, the other normally closed and being adapted to provide for a variably restricted flow between the cylinders in either direction and from either one of said cylinders into the fluid chamber in response to increasing fluid pressure.

In testimony whereof I hereto affix my signature.

WILLIAM A. CHRYST.